(12) United States Patent
Zhao et al.

(10) Patent No.: US 12,531,760 B2
(45) Date of Patent: Jan. 20, 2026

(54) WIRELESS COMMUNICATION METHOD, COMMUNICATION APPARATUS, AND COMMUNICATION SYSTEM

(71) Applicant: Huawei Technologies Co., Ltd., Shenzhen (CN)

(72) Inventors: Pengtao Zhao, Shenzhen (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 18/464,916

(22) Filed: Sep. 11, 2023

(65) Prior Publication Data
US 2023/0421407 A1 Dec. 28, 2023

Related U.S. Application Data

(63) Continuation of application No. PCT/CN2022/073852, filed on Jan. 25, 2022.

(30) Foreign Application Priority Data

Mar. 12, 2021 (CN) .......................... 202110268015.6

(51) Int. Cl.
*H04L 12/18* (2006.01)
*H04L 12/46* (2006.01)
*H04L 65/611* (2022.01)

(52) U.S. Cl.
CPC ........ *H04L 12/1886* (2013.01); *H04L 12/189* (2013.01); *H04L 12/4645* (2013.01); *H04L 65/611* (2022.05)

(58) Field of Classification Search
None
See application file for complete search history.

(56) References Cited

U.S. PATENT DOCUMENTS

| 10,887,122 | B1 * | 1/2021 | Nagarajan | H04L 47/24 |
| 2013/0343384 | A1 | 12/2013 | Shepherd et al. | |
| 2016/0316351 | A1 * | 10/2016 | Kodaypak | H04L 65/611 |
| 2021/0044445 | A1 * | 2/2021 | Bottorff | H04L 12/185 |

FOREIGN PATENT DOCUMENTS

| CN | 110417633 A | 11/2019 |
| CN | 111010673 A | 4/2020 |
| CN | 111866987 A | 10/2020 |

OTHER PUBLICATIONS

Holbrook, Cisco Systems, "Scoping Filters for Source-Specific Multicast, <draft-holbrook-ssm-scoping-00.txt>", Oct. 19, 2003, XP015014479, total 10 pages.
Holbrook et al., Arastra, Inc., "Source-Specific Multicast for IP", RFC4607, Aug. 1, 2006, XP015047372, total 19 pages.
(Continued)

*Primary Examiner* — Angela Nguyen
(74) *Attorney, Agent, or Firm* — Slater Matsil, LLP

(57) ABSTRACT

A wireless communication method includes: obtaining subnet information of a first subnet corresponding to a first session; receiving a data packet, where the data packet is a multicast packet or a broadcast packet; determining, based on the subnet information, that the data packet corresponds to the first session in the first subnet; and sending the data packet via the first session.

20 Claims, 7 Drawing Sheets

(56) References Cited

OTHER PUBLICATIONS

3rd Generation Partnership Project; Technical Specification Group Services and System Aspects; System architecture for the 5G System (5GS); Stage 2 (Release 16). 3GPP TS 23.501 V16.7.0 (Dec. 2020), total 450 pages.
3rd Generation Partnership Project; Technical Specification Group Services and System Aspects; Procedures for the 5G System (5GS); Stage 2 (Release 16). 3GPP TS 23.502 V16.7.1 (Jan. 2021), total 603 pages.
3rd Generation Partnership Project; Technical Specification Group Core Network and Terminals; Interface between the Control Plane and the User Plane Nodes; Stage 3 (Release 16). 3GPP TS 29.244 V16.6.0 (Dec. 2020), total 318 pages.

\* cited by examiner

WIRELESS COMMUNICATION METHOD, COMMUNICATION APPARATUS, AND COMMUNICATION SYSTEM

CROSS-REFERENCE TO RELATED APPLICATIONS

This is a continuation of International Application No. PCT/CN2022/073852, filed on Jan. 25, 2022, which claims priority to Chinese Patent Application No. 202110268015.6, filed on Mar. 12, 2021. The disclosures of the aforementioned applications are hereby incorporated by reference in their entireties.

TECHNICAL FIELD

This application relates to the field of wireless communication technologies, and in particular, to a wireless communication method, a communication apparatus, and a communication system.

BACKGROUND

After registering with a network, a terminal may initiate session establishment to the network, and the terminal and the network may subsequently communicate with each other via an established session.

When a user plane network element receives a multicast packet or a broadcast packet, currently, there is no good method for sending the multicast packet or the broadcast packet by the user plane network element via which session.

SUMMARY

Embodiments of this application provide a wireless communication method, a communication apparatus, and a communication system, to send a multicast packet or a broadcast packet at a granularity of a subnet, thereby precisely sending the multicast packet or the broadcast packet.

According to a first aspect, an embodiment of this application provides a wireless communication method. The method may be performed by a user plane network element or a module (for example, a chip) in a user plane network element. The method includes: obtaining subnet information of a first subnet corresponding to a first session; receiving a data packet, where the data packet is a multicast packet or a broadcast packet; determining, based on the subnet information, that the data packet corresponds to the first session in the first subnet; and sending the data packet via the first session.

According to the method, the user plane network element may obtain a correspondence between the first session and the subnet information of the first subnet, so as to send the received multicast packet or broadcast packet via a corresponding session at a granularity of a subnet, thereby precisely sending the data packet.

In a possible implementation method, the method includes: determining subnet information corresponding to a source IP address in the data packet; and if the subnet information corresponding to the first session is the same as the subnet information corresponding to the source IP address, determining that the data packet corresponds to the first session. According to the method, a session corresponding to a data packet can be accurately determined.

In a possible implementation method, the method includes: receiving a packet detection rule from a session management network element, where the packet detection rule includes the subnet information.

In a possible implementation method, the method includes: receiving indication information from the session management network element; detecting, based on the indication information, a data packet used for configuring IP information for the first session, where the data packet used for configuring IP information for the first session includes IP information corresponding to the first session, and the first session is an EtherType session; and sending the IP information to the session management network element, where the IP information is used to determine the subnet information.

In a possible implementation method, the method includes: obtaining an identifier of a first VLAN in the data packet; obtaining a VLAN set, where the VLAN set includes one or more VLANs in the first subnet; and if the first VLAN belongs to the VLAN set, determining that the data packet corresponds to the first session. According to the method, a session corresponding to a data packet can be accurately determined.

In a possible implementation method, the method includes: receiving a packet detection rule from a session management network element, where the packet detection rule includes the VLAN set.

According to a second aspect, an embodiment of this application provides a wireless communication method. The method may be performed by a session management network element or a module (for example, a chip) in a session management network element. The method includes: obtaining subnet information of a first subnet corresponding to a first session; and sending the subnet information to a user plane network element, where the subnet information is used to detect a data packet that matches the subnet information.

In a possible implementation method, the method includes: sending a packet detection rule to the user plane network element, where the packet detection rule includes the subnet information.

In a possible implementation method, the method includes: sending indication information to the user plane network element, where the indication information indicates to detect a data packet used for configuring IP information for the first session, and the first session is an EtherType session; receiving, from the user plane network element, the IP information corresponding to the first session; and determining the subnet information based on the IP information.

In a possible implementation method, the method includes: receiving the subnet information from an authentication, authorization and accounting server.

In a possible implementation method, the method includes: requesting the subnet information from the authentication, authorization and accounting server.

In a possible implementation method, the method includes: receiving the subnet information from a terminal.

According to a third aspect, an embodiment of this application provides a wireless communication method. The method may be performed by a terminal, a module (for example, a chip or a modem) in a terminal, an apparatus including a terminal function, an authentication, authorization and accounting server, or a module (for example, a chip) in an authentication, authorization and accounting server. The method includes: obtaining subnet information of a first subnet corresponding to a first session; and sending the subnet information to a session management network element, where the subnet information is used to detect a data packet that matches the subnet information.

In a possible implementation method, the method includes: receiving the subnet information from an authentication, authorization and accounting server or a DHCP server.

According to a fourth aspect, an embodiment of this application provides a communication apparatus. The apparatus may be a user plane network element or a module (for example, a chip) in a user plane network element. The apparatus has a function of implementing any implementation method of the first aspect. The function may be implemented by using hardware, or may be implemented by executing corresponding software by hardware. The hardware or the software includes one or more modules corresponding to the foregoing function.

According to a fifth aspect, an embodiment of this application provides a communication apparatus. The apparatus may be a session management network element or a module (for example, a chip) in a session management network element. The apparatus has a function of implementing any implementation method of the second aspect. The function may be implemented by using hardware, or may be implemented by executing corresponding software by hardware. The hardware or the software includes one or more modules corresponding to the foregoing function.

According to a sixth aspect, an embodiment of this application provides a communication apparatus. The apparatus may be a terminal, a module (for example, a chip or a modem) in a terminal, an apparatus including a terminal function, an authentication, authorization and accounting server, or a module (for example, a chip) in an authentication, authorization and accounting server. The apparatus has a function of implementing any implementation method of the third aspect. The function may be implemented by using hardware, or may be implemented by executing corresponding software by hardware. The hardware or the software includes one or more modules corresponding to the foregoing function.

According to a seventh aspect, an embodiment of this application provides a communication apparatus, including a module configured to perform any implementation method of the first aspect to the third aspect.

According to an eighth aspect, an embodiment of this application provides a communication apparatus, including a processor and an interface circuit. The interface circuit is configured to: receive a signal from another communication apparatus other than the communication apparatus and transmit the signal to the processor, or send a signal from the processor to another communication apparatus other than the communication apparatus. The processor is configured to implement any implementation method of the first aspect to the third aspect by using a logic circuit or by executing code instructions.

According to a ninth aspect, an embodiment of this application provides a communication apparatus, including a processor coupled to a memory. The processor is configured to invoke a program stored in the memory, to perform any implementation method of the first aspect to the third aspect. The memory may be located inside the apparatus, or may be located outside the apparatus. In addition, there may be one or more processors.

According to a tenth aspect, an embodiment of this application provides a communication apparatus, including a processor and a memory. The memory is configured to store computer instructions. When the communication apparatus runs, the processor executes the computer instructions stored in the memory, so that the communication apparatus performs any implementation method of the first aspect to the third aspect.

According to an eleventh aspect, an embodiment of this application further provides a computer program product. The computer program product includes a computer program. When the computer program is run by a communication apparatus, any implementation method of the first aspect or the second aspect is implemented.

According to a twelfth aspect, an embodiment of this application further provides a computer-readable storage medium. The storage medium stores a computer program or instructions. When the computer program or the instructions are executed by a communication apparatus, any implementation method of the first aspect to the third aspect is implemented.

According to a thirteenth aspect, an embodiment of this application further provides a communication system. The communication system includes a communication apparatus configured to perform any implementation method of the first aspect and a communication apparatus configured to perform any implementation method of the second aspect.

In a possible implementation method, the communication system further includes a communication apparatus configured to perform any implementation method of the third aspect.

According to a fourteenth aspect, an embodiment of this application further provides a communication system. The communication system includes a communication apparatus configured to perform any implementation method of the second aspect and a communication apparatus configured to perform any implementation method of the third aspect.

DETAILED DESCRIPTION OF ILLUSTRATIVE EMBODIMENTS

To make the objectives, technical solutions, and advantages of this application clearer, the following further describes this application in detail with reference to the accompanying drawings. Specific operation methods in the method embodiments may also be applied to an apparatus embodiment or a system embodiment.

Figure 1A:
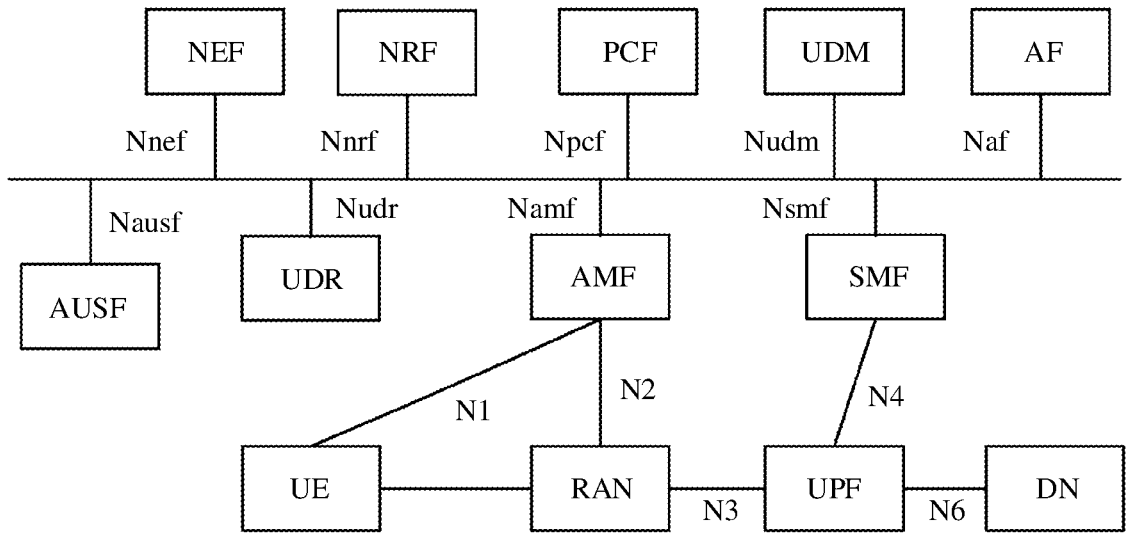
FIG. 1(a) is a schematic diagram of a 5G network architecture based on a service-based architecture.

FIG. 1(a) is a schematic diagram of a 5th generation (5G) network architecture based on a service-based architecture. The 5G network architecture shown in FIG. 1(a) may include three parts: a terminal, a data network (DN), and an operator network. The following briefly describes functions of some network elements in the 5G network architecture.

The operator network may include one or more of the following network elements: an authentication server function (AUSF) network element, a network exposure function (NEF) network element, a policy control function (PCF) network element, a unified data management (UDM) network element, a unified data repository (UDR), a network repository function (NRF) network element, an application function (AF) network element, an access and mobility management function (AMF) network element, a session management function (SMF) network element, a radio access network (RAN) device, a user plane function (UPF) network element, a network slice selection function (NSSF) network element (not shown in the figure), or the like. In the operator network, a network element or device other than the radio access network device may be referred to as a core network element or a core network device.

The radio access network device may be a base station, an evolved NodeB (eNodeB), a transmission/reception point (TRP), a next generation NodeB (gNB) in a 5G mobile communication system, a next generation NodeB in a 6G mobile communication system, a base station in a future mobile communication system, an access node in a wireless fidelity (Wi-Fi) system, or the like; or may be a module or a unit that completes some functions of a base station, for example, may be a central unit (CU), or may be a distributed unit (DU). The radio access network device may be a macro base station, may be a micro base station or an indoor base station, or may be a relay node, a donor node, or the like. A specific technology and a specific device form used for the radio access network device are not limited in embodiments of this application. In embodiments of this application, description is provided by using a base station as an example of the radio access network device.

The terminal may also be referred to as a terminal device, user equipment (user equipment, UE), a mobile station, a mobile terminal, or the like. The terminal may be widely used in various scenarios, for example, device-to-device (D2D) communication, vehicle-to-everything (V2X) communication, machine-type communication (MTC), Internet of Things (IoT), virtual reality, augmented reality, industrial control, self-driving, remote medical, a smart grid, smart furniture, smart office, smart wear, smart transportation, a smart city, or the like. The terminal may be a mobile phone, a tablet computer, a computer with a wireless receiving/transmitting function, a wearable device, a vehicle, an unmanned aerial vehicle, a helicopter, an airplane, a ship, a robot, a robotic arm, a smart home device, or the like. A specific technology and a specific device form used for the terminal are not limited in embodiments of this application.

The base station and the terminal may be at fixed locations or may be movable. The base station and the terminal may be deployed on land, including indoor or outdoor, or handheld or vehicle-mounted; may be deployed on a water surface; or may be deployed on an airplane, a balloon, and a satellite in the air. Application scenarios of the base station and the terminal are not limited in embodiments of this application.

The AMF network element performs functions of mobility management, access authentication/authorization, and the like. In addition, the AMF network element is further responsible for transferring user policies between the terminal and the PCF.

The SMF network element performs functions of session management, execution of control policies delivered by the PCF, UPF selection, terminal Internet Protocol (Internet Protocol, IP) address allocation, and the like.

The UPF network element, serving as an interface UPF between a 3GPP network and the data network, completes user plane data forwarding, session/flow level-based charging statistics, and bandwidth limiting, and the like.

The UDM network element performs functions of subscription data management, user access authorization, and the like.

The UDR performs functions of storage and retrieval of subscription data, policy data, application data, and other types of data.

The NEF network element is configured to support exposure of capabilities and events.

The AF network element is responsible of transferring a requirement of an application side for a network side, for example, a quality of service (QoS) requirement, user status event subscription, or the like. The AF may be a third-party function entity, or may be an operator-deployed application service, for example, an IP multimedia subsystem (IMS) voice call service.

The PCF network element is responsible for policy control functions, including charging for a session and a service flow level, QoS bandwidth assurance and mobility management, terminal policy decision, and the like.

The NRF network element may be configured to provide a network element discovery function, and provide, based on a request of another network element, network element information corresponding to a network element type. The NRF further provides network element management services, including network element registration, update, and deregistration, network element status subscription and push, and the like.

The AUSF network element is responsible for authenticating a user, to determine whether the user or a device is allowed to access a network.

The NSSF network element is configured to select a network slice, count users in the network slice, and the like.

The DN is a network located outside the operator network. A plurality of DNs can access the operator network, and a plurality of services can be deployed on the DN, to provide services including data and/or voice and the like for a terminal. For example, the DN is a private network of an intelligent factory, a sensor installed in a workshop of the intelligent factory may be the terminal, a control server of the sensor is deployed in the DN, and the control server can provide a service for the sensor. The sensor may communicate with the control server, obtain an instruction of the control server, transmit collected sensor data to the control server based on the instruction, and the like. For another example, the DN is an internal office network of a company, a mobile phone or a computer of an employee in the company may be the terminal, and the mobile phone or the computer of the employee can access information, a data resource, or the like on the internal office network of the company.

In FIG. 1(a), Nausf, Nnef, Npcf, Nudm, Naf, Namf, and Nsmf are respectively service-based interfaces provided by the AUSF, the NEF, the PCF, the UDM, the AF, the AMF, and the SMF, and are used to invoke a corresponding service-based operation. N1, N2, N3, N4, and N6 are interface sequence numbers. For meanings of these interface sequence numbers, refer to meanings defined in the 3rd generation partnership project (3GPP) standard protocol. This is not limited herein.

Figure 1B:
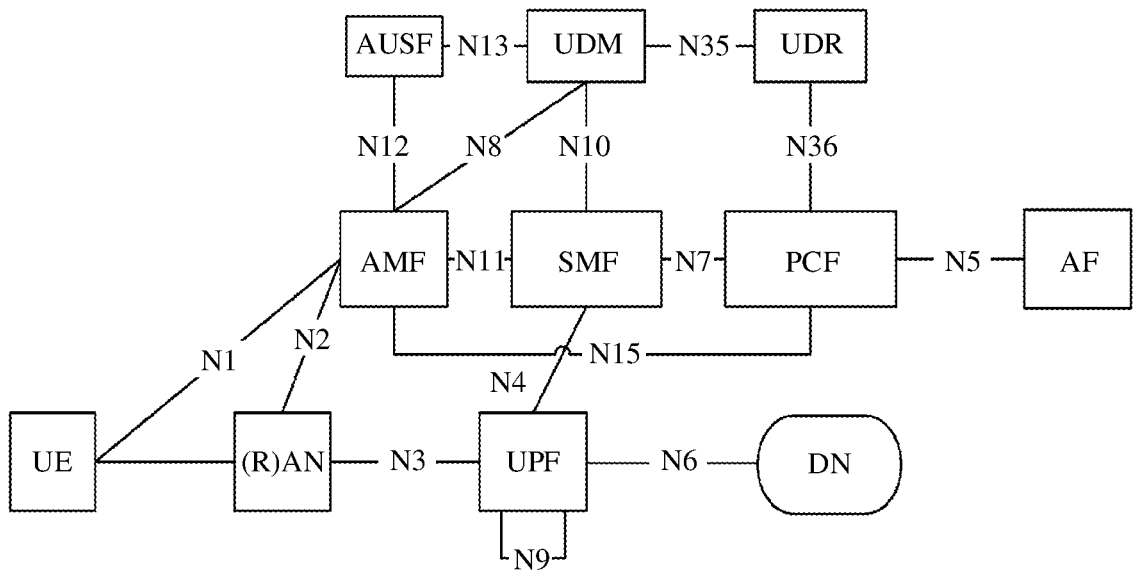
FIG. 1(b) is a schematic diagram of a 5G network architecture based on point-to-point interfaces.

FIG. 1(b) is a schematic diagram of a 5G network architecture based on point-to-point interfaces. For descriptions of functions of network elements in the 5G network architecture, refer to descriptions of functions of corresponding network elements in FIG. 1(a). Details are not described again. A main difference between FIG. 1(b) and FIG. 1(a) lies in the following: interfaces between control plane network elements in FIG. 1(a) are service-based interfaces, and interfaces between control plane network elements in FIG. 1(b) are point-to-point interfaces.

In the architecture shown in FIG. 1(b), names and functions of interfaces between network elements are as follows.
(1). N1: This is an interface between an AMF and a terminal, for transferring QoS control rules or the like to the terminal.
(2). N2: This is an interface between the AMF and a RAN, for transferring radio bearer control information or the like from a core network side to the RAN.
(3). N3: This is an interface between the RAN and a UPF, for transferring uplink and downlink user-plane data between the RAN and UPF.
(4). N4: This is an interface between an SMF and the UPF, for transferring information between a control plane and a user plane, including delivering forwarding rules, QoS control rules, traffic statistics rules, or the like from the control plane to the user plane, and reporting user-plane information.
(5). N5: This is an interface between an AF and a PCF, for delivering application service requests and reporting network events.
(6). N6: This is an interface between the UPF and a DN, for transferring uplink and downlink user data flows between the UPF and the DN.
(7). N7: This is an interface between the PCF and the SMF, for delivering control policies at a protocol data unit (PDU) session granularity and a service data flow granularity.
(8). N8: This is an interface between the AMF and a UDM, and may be used by the AMF to obtain, from the UDM, access and mobility management-related subscription data and authentication data, and used by the AMF to register current mobility management-related information of the terminal with the UDM, and the like.
(9). N9: This is a user-plane interface between UPFs, for transferring uplink and downlink user data flows between the UPFs.
(10). N10: This is an interface between the SMF and the UDM, used by the SMF to obtain session management-related subscription data from the UDM, used by the SMF to register current session-related information of the terminal with the UDM, and the like.
(11). N11: This is an interface between the SMF and the AMF, for transferring PDU session tunnel information between the RAN and the UPF, transferring control messages sent to the terminal, transferring radio resource control information sent to the RAN, and the like.
(12). N12: This is an interface between the AMF and an AUSF, used by the AMF to initiate an authentication procedure to the AUSF, where an SUCI may be carried as a subscription identifier.
(13). N13: This is an interface between the UDM and the AUSF, used by the AUSF to obtain a user authentication vector from the UDM to perform an authentication procedure.
(14). N15: This is an interface between the PCF and the AMF, and may be used to deliver a terminal policy and an access control-related policy.
(15). N35: This is an interface between the UDM and a UDR, and may be used by the UDM to obtain user subscription data information from the UDR.
(16). N36: This is an interface between the PCF and the UDR, and may be used by the PCF to obtain policy-related subscription data and application data-related information from the UDR.

It may be understood that, the foregoing network element or function may be a network element in a hardware device, may be a software function running on dedicated hardware, or may be a virtualization function instantiated on a platform (for example, a cloud platform). Optionally, the foregoing network element or function may be implemented by one device, may be jointly implemented by a plurality of devices, or may be a functional module in a device. This is not specifically limited in embodiments of this application.

A session management network element and a user plane network element in this application may be respectively the SMF and the UPF in FIG. 1(a) or FIG. 1(b), or may be network elements, in a future communication network such as a 6th generation (6th generation, 6G) network, that have functions of the SMF and the UPF. This is not limited in this application. In embodiments of this application, description is provided by respectively using the SMF and the UPF as examples of the session management network element and the user plane network element.

In this application, an authentication, authorization and accounting server (not shown in both FIG. 1(a) and FIG. 1(b)) is further deployed in the operator network or the DN. The authentication, authorization and accounting server is configured to perform secondary authentication/authorization on a PDU session, and may provide, for a core network, an IP address of the PDU session, a media access control (media access control, MAC) address list, a list of virtual local area networks (virtual local area network, VLAN) allowed to be used, and the like. The authentication, authorization and accounting server in this application may be a data network authentication, authorization and accounting (data network authentication, authorization and accounting, DN-AAA) server, or may be a network element, in a future communication network such as a 6G network, that has functions of the authentication, authorization and accounting server. This is not limited in this application. In embodiments of this application, description is provided by using the DN-AAA server as an example of the authentication, authorization and accounting server.

For ease of understanding, the following first describes some terms or nouns appearing in embodiments of this application.

I. IP Address

IP addresses may be classified into the following types: class A IP address: from 0.0.0.0 to 127.255.255.255; class B IP address: from 128.0.0.0 to 191.255.255.255;

class C IP address: 192.0.0.0 to 233.255.255.255;
class D IP address: from 224.0.0.0 to 239.255.255.255; and
class E IP address: from 240.0.0.0 to 247.255.255.255.

An IP address includes a network number, a subnet number, and a host number. For example, a network number of a class A IP address occupies the first 8 bits of the IP address, a network number of a class B IP address occupies the first 16 bits of the IP address, and a network number of a class C IP address occupies the first 24 bits of the IP address.

It can be noted that an IP address may be expressed by using a plurality of number systems, for example, an IP address is expressed in a binary format, a decimal format, or a hexadecimal format. For example, an IP address is expressed as 140.252.254.100 in a decimal format, a binary expression method corresponding to the IP address is 1000110011111100111111100100, and a hexadecimal expression method corresponding to the IP address is 0x8cfcfe64. For ease of description, the following uses a decimal expression method to express an IP address.

Figure 2:
FIG. 2 is an example diagram of a class B IP address.

FIG. 2 is an example diagram of a class B IP address. For example, a network number of the class B IP address occupies 16 bits, for example, 140.252. In the remaining 16 bits, the first 8 bits are a subnet number, and the last 8 bits are a host number.

The network number may also be referred to as an IP network number, the subnet number may also be referred to as an IP subnet number, and the host number may also be referred to as an IP host number. Two IP addresses with a same network number and a same subnet number are referred to as belonging to a same IP subnet. For example, an IP address 1 is 140.252.254.1, an IP address 2 is 140.252.254.2, and an IP address 3 is 140.252.253.3. In addition, when the three IP addresses are expressed by using a binary method, the first 24 bits of each IP address are used to indicate a network number and a subnet number. To be specific, 140.252.254 in the IP address 1 indicates a network number and a subnet number of the IP address 1, 140.252.254 in the IP address 2 indicates a network number and a subnet number of the IP address 2, and 140.252.253 in the IP address 3 indicates a network number and a subnet number of the IP address 3. Therefore, the IP address 1 and the IP address 2 belong to a same IP subnet, the IP address 1 and the IP address 3 belong to different IP subnets, and the IP address 2 and the IP address 3 belong to different IP subnets.

II. Subnet Mask

The subnet mask occupies 32 bits and indicates a quantity of bits occupied by a subnet number and a host number in an IP address. For example, a bit with a value of 1 in the subnet mask is reserved for a network number and subnet number, and a bit with a value of 0 in the subnet mask is reserved for the host number.

Figures 3, 4, 5:
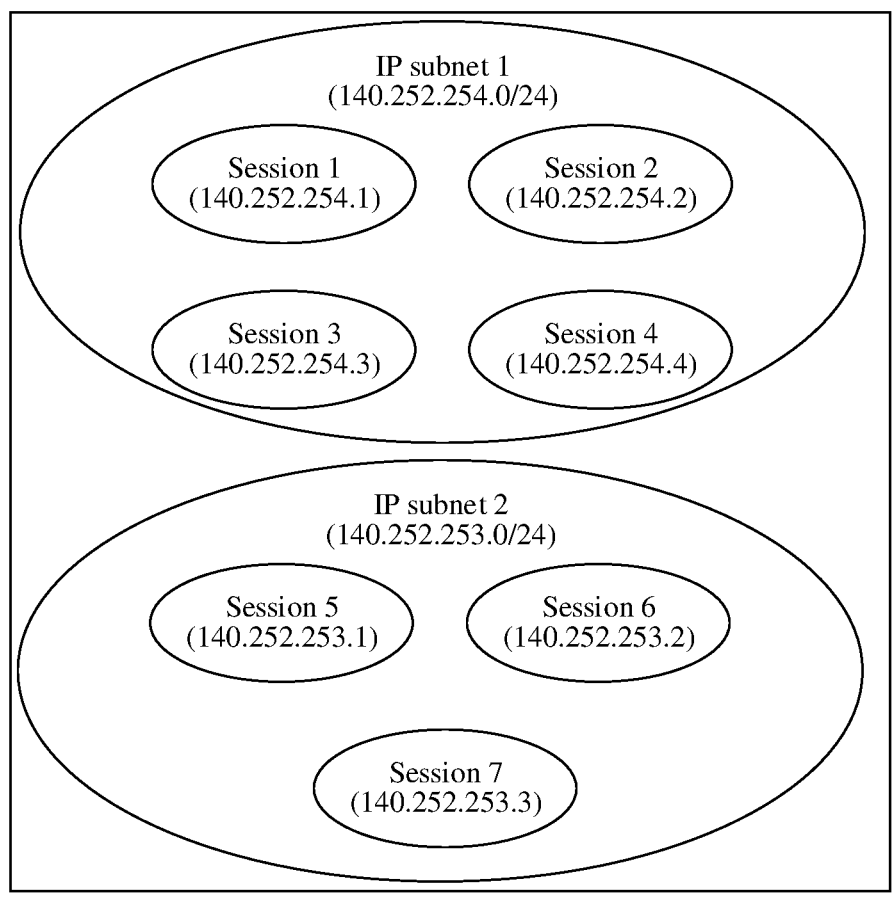
FIG. 3 is a schematic diagram of a format of a subnet mask of a class B address.
FIG. 4 is a schematic diagram of another format of a subnet mask of a class B address.
FIG. 5 is an example diagram of a relationship between an IP subnet and a session.

FIG. 3 is a schematic diagram of a format of a subnet mask of a class B address. The subnet mask is expressed as 11111111111111111111111100000000 in a binary format, and may also be expressed as 255.255.255.0 in a decimal format or expressed as 0xffffff00 in a hexadecimal format. Because a network number of the class B address occupies 16 bits, the subnet mask indicates that the first 16 bits of the IP address are used for the network number, the first 8 bits of the last 16 bits are used for a subnet number, and the last 8 bits of the last 16 bits are used for a host number.

FIG. 4 is a schematic diagram of another format of a subnet mask of a class B address. The subnet mask is expressed as 11111111111111111111111111000000 in a binary format, and may also be expressed as 255.255.255.192 in a decimal format or expressed as 0xffffffc0 in a hexadecimal format. The subnet mask indicates that the first 16 bits of the IP address are used for a network number, the first 10 bits of the last 16 bits are used for a subnet number, and the last 6 bits of the last 16 bits are used for a host number.

In actual application, an IP address and a subnet mask of the IP address may be expressed in a format of "IP address/total quantity of bits of a network number and a subnet number". The "IP address/total quantity of bits of a network number and a subnet number" may also be referred to as configuration information of the IP address. For example, configuration information of a class B IP address is 140.252.254.1/24, which indicates that the IP address is 140.252.254.1, and 24 indicates that the first 24 bits of the IP address are used to identify a network number and a subnet number when the IP address is expressed by using a binary method, to be specific, a subnet mask of the IP address is 255.255.255.0. It may be understood that "/24" is a simple expression of the subnet mask 255.255.255.0.

III. Relationship Between an IP Subnet and a Session

One IP subnet corresponds to one or more sessions. When one IP subnet corresponds to a plurality of sessions, IP addresses of the plurality of sessions belong to a same IP subnet. Different sessions in a same IP subnet may belong to a same terminal or may belong to different terminals. Different sessions in different IP subnets may belong to a same terminal or may belong to different terminals.

FIG. 5 is an example diagram of a relationship between an IP subnet and a session. A session 1, a session 2, a session 3, and a session 4 correspond to an IP subnet 1, and a session 5, a session 6, and a session 7 correspond to an IP subnet 2. IP addresses of the sessions are shown in the figure. Herein, any two sessions in the session 1 to the session 7 may belong to a same terminal or may belong to different terminals. For example, the session 1 and the session 2 belong to a terminal 1, the session 3 and the session 4 belong to a terminal 2, the session 5 belongs to a terminal 3, and the session 6 and the session 7 belong to a terminal 4. For another example, the session 1, the session 2, and the session 5 belong to a terminal 1, the session 3 and the session 4 belong to a terminal 2, and the session 6 and the session 7 belong to a terminal 3.

IV. VLAN

An Ethernet switch usually has a dozen of ports or dozens of ports. By default, devices (for example, terminals) connected to these ports can perform layer 2 communication without blocking. However, in some cases, it is expected that devices on some ports cannot be accessed by a device on another port. In this case, the default working mode cannot be used, and instead, a function may be introduced. The function can be used to combine any quantity of ports on the switch, and these combined ports form a closed system. Devices connected to the closed system can communicate with each other, and a device connected to the closed system and a device not connected to the closed system cannot perform layer 2 communicate with each other. This combination forms a virtual local area network.

All devices in a same virtual local area network belong to a same IP subnet, to be specific, IP addresses of any two devices in a same virtual local area network have a same network number and a same subnet number. Devices in different virtual local area networks may belong to a same IP subnet or may belong to different IP subnets.

Figure 6:
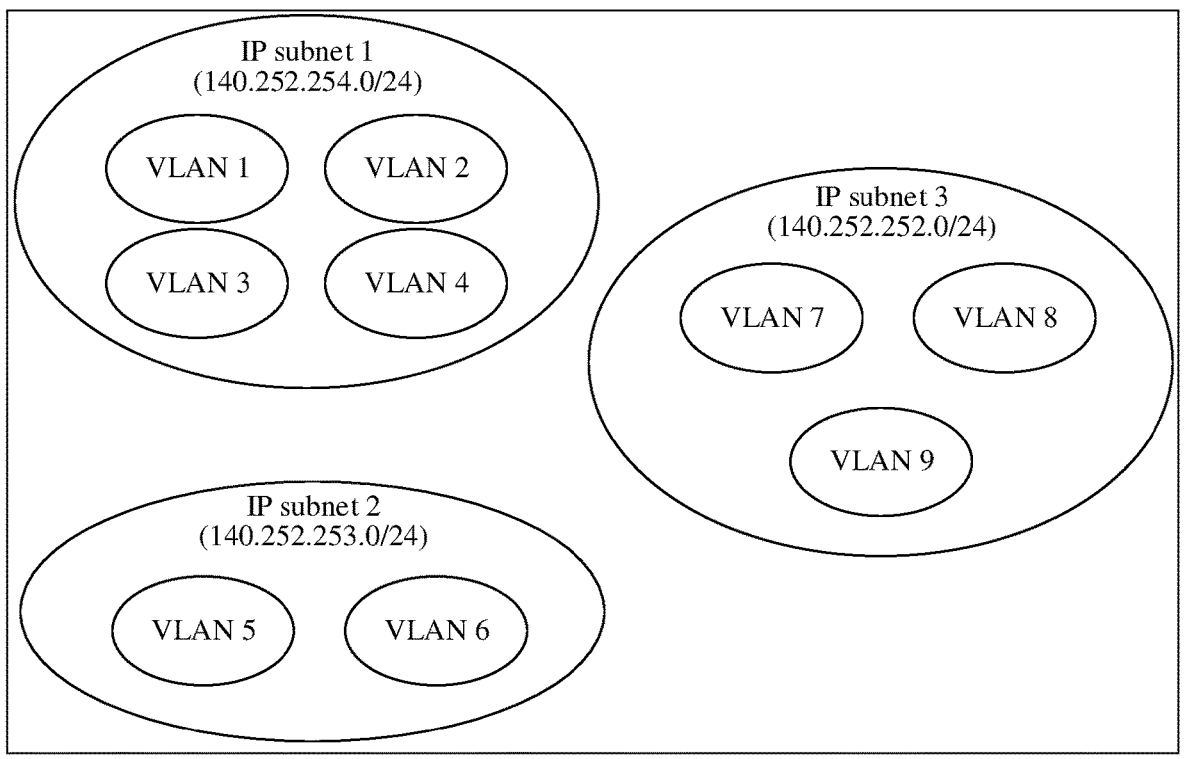
FIG. 6 is an example diagram of a relationship between a VLAN and an IP subnet.

FIG. 6 is an example diagram of a relationship between a VLAN and an IP subnet. In this example, a VLAN 1, a VLAN 2, a VLAN 3, and a VLAN 4 all correspond to an IP subnet 1, both a VLAN 5 and a VLAN 6 correspond to an IP subnet 2, and a VLAN 7, a VLAN 8, and a VLAN 9 all correspond to an IP subnet 3. Identifiers of the VLAN 1 to the VLAN 9 are respectively a VLAN ID 1 to a VLAN ID 9.

Therefore, IP addresses of sessions established by terminals in the VLAN 1 to the VLAN 4 all correspond to the IP subnet 1, IP addresses of sessions established by terminals in the VLAN 5 and the VLAN 6 all correspond to the IP subnet 2, and IP addresses of sessions established by terminals in the VLAN 7 to the VLAN 9 all correspond to the IP subnet 3.

VLANs in a same IP subnet can form a VLAN set. For example, the VLAN 1 to the VLAN 4 form a VLAN set 1, the VLAN 5 and the VLAN 6 form a VLAN set 2, and the VLAN 7 to the VLAN 9 form a VLAN set 3.

V. Unicast, Multicast, and Broadcast

Unicast is a one-to-one communication mode between devices (for example, terminals). Devices in a network communicate with each other through a routing node (for example, a switch or a router). After a sending device sends data to the routing node, the routing node only forwards the data but does not replicate the data. If 10 receiving devices require same data, the sending device needs to transmit the data to the receiving devices one by one, and repeats same work 10 times. However, because unicast can respond to a requirement of each device in time, current web browsing is usually in a unicast mode. The router and the switch in the network select a transmission path based on a destination IP address, and transmit unicast data to a device corresponding to the destination IP address. A unicast IP address is an IP address of a single device.

Multicast is a one-to-group communication mode between devices. Devices joining in a same group can receive data in the group, and a switch and a router in a network replicate the data and forward the data to only a device requiring the data. A device can request, from the router, to join or exit a group. The router and the switch in the network selectively replicate and transmit data, that is, transmits the data to only a device in the group. In this way, data can be transmitted to a plurality of devices in a group at a time, and it is also ensured that communication between devices outside the group is not affected. A multicast IP address is usually a class D IP address.

Broadcast is a one-to-all communication mode between devices. A network unconditionally replicates and forwards data sent by each device, and generally, all devices can receive data sent through broadcast. Because no path selection is required, network costs are low. A cable television network is a typical broadcast network. A television actually receives signals from all channels, but restores a signal from only one channel to a picture. Broadcast is also allowed to exist in a data network, but is usually restricted in a local area network range of a layer 2 switch. Broadcast data is forbidden to pass through a router, to prevent the broadcast data from affecting devices in a large area. There are four types of broadcast IP addresses: (1) a restricted broadcast address, that is, 255.255.255.255; (2) a broadcast address pointing to a network, that is, an address whose host number is all 1s; (3) a broadcast address pointing to a subnet, that is, an address whose a host number is all 1s and has a specific subnet number; and (4) a broadcast address pointing to all subnets, that is, an address whose subnet number and host number each are all 1s and has a specific network number.

Currently, when a terminal initiates establishment of a session to a network, an IP address needs to be allocated to the session of the terminal. When a plurality of sessions are established on the terminal, one IP address is allocated to each session. The IP address of the session of the terminal may be allocated by a network element (for example, an SMF or a UPF) in a core network, or may be allocated by another device (for example, a DN-AAA server, a dynamic host configuration protocol (dynamic host configuration protocol, DHCP) server).

Currently, a possible method for sending a data packet (which may be a multicast packet or a broadcast packet) is as follows. A network element such as the UPF in the core network sends, based on a DNN granularity, a data packet to a terminal associated with a DNN. For example, both an IP address of a session 1 of a terminal 1 and an IP address of a session 2 of a terminal 2 belong to an IP subnet 1; an IP address of a session 3 of a terminal 3, an IP address of a session 4 of a terminal 4, an IP address of a session 5 of a terminal 5, and an IP address of a session 6 of a terminal 6 all belong to an IP subnet 2; the session 1 of the terminal 1, the session 2 of the terminal 2, the session 3 of the terminal 3, and the session 4 of the terminal 4 all correspond to a DNN 1; and the session 5 of the terminal 5 and the session 6 of the terminal 6 correspond to a DNN 2. When receiving a data packet, the UPF first determines a DNN corresponding to the data packet, and then sends the data packet to a session corresponding to the DNN.

For example, the UPF receives a data packet from the IP subnet 1, and the data packet corresponds to the DNN 1. Then, the UPF determines a session corresponding to the DNN 1, for example, the session 1, the session 2, the session 3, and the session 4. Therefore, the UPF sends the data packet to the session 1, the session 2, the session 3, and the session 4. It can be learned from the method that, the UPF not only sends the data packet to the session in the IP subnet 1, but also sends the data packet to the session in the IP subnet 2. However, actually, the data packet from the IP subnet 1 may need to be sent to only a session of a terminal in the IP subnet 1. Because a multicast packet or a broadcast packet cannot be sent based on an IP subnet granularity (or referred to as a subnet granularity), the multicast packet or the broadcast packet may be incorrectly sent to some terminals, causing a waste of the core network and air interface resources and generating a security risk.

For another example, the UPF receives a data packet from the IP subnet 2, and the data packet corresponds to the DNN 2. Then, the UPF determines a session corresponding to the DNN 2, for example, the session 5 and the session 6. Therefore, the UPF sends the data packet to the session 5 and the session 6. It can be learned from the method that, the UPF sends the data packet to only the session 5 and the session 6 in the IP subnet 2, but does not send the data packet to the session 3 and the session 4 in the IP subnet 2. In other words, the data packet cannot be sent based on an IP subnet granularity. Because a multicast packet or a broadcast packet cannot be sent based on the IP subnet granularity, the multicast packet or the broadcast packet may be unable to be sent to some terminals.

To solve a problem that a multicast packet or a broadcast packet cannot be sent based on an IP subnet granularity currently, embodiments of this application provide a following solution. A network element such as an SMF in a core network obtains IP subnet information of a session of a terminal, and then configures, for a UPF, the IP subnet information of the session of the terminal, so that the UPF can match a received data packet (which may be a multicast packet or a broadcast packet) with the IP subnet information of the session of the terminal. If the data packet received by the UPF matches the IP subnet information of the session of the terminal, the UPF sends the data packet by using the session of the terminal. Based on the method, the UPF may determine an IP subnet corresponding to a received data packet, and then send the data packet via a session of a terminal in the IP subnet, to send the data packet based on an IP subnet granularity.

Each wireless communication method provided in embodiments of this application may be performed by a UPF or a module (for example, a chip) in a UPF, an SMF or a module (for example, a chip) in an SMF, a DN-AAA server or a module (for example, a chip) in a DN-AAA server, and a terminal or a module (for example, a chip or a modem) in a terminal, or an apparatus including a terminal function. For ease of description, in the following description, an example in which the UPF, the SMF, the DN-AAA server, and the terminal perform the wireless communication method is used for description.

Figure 7:
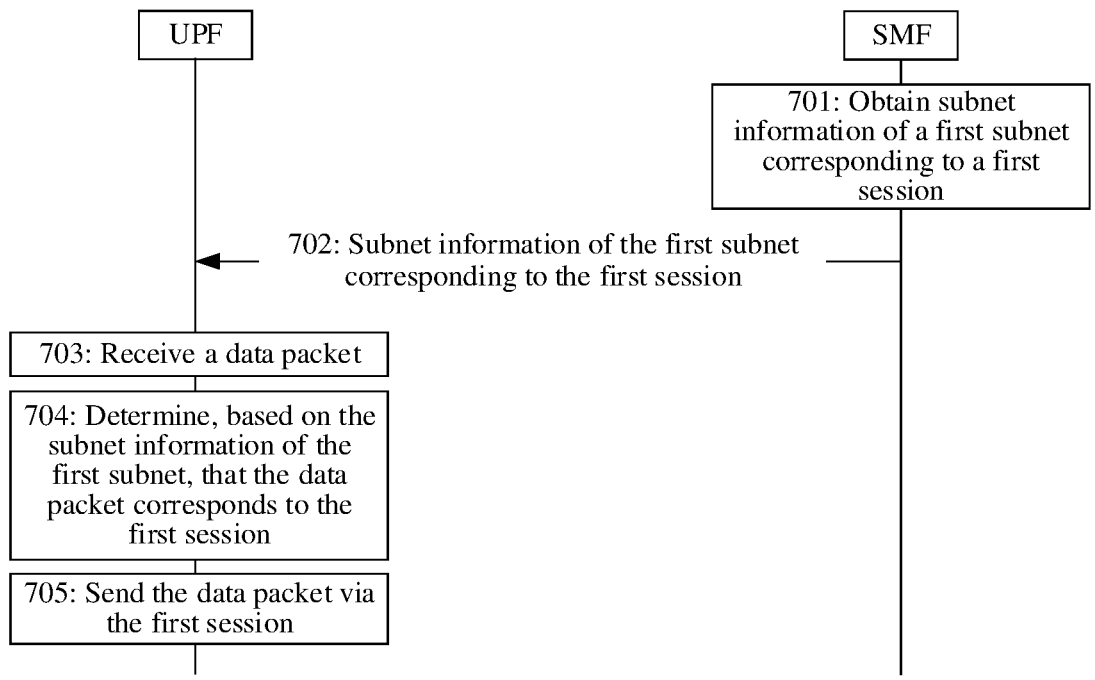
FIG. 7 is a schematic diagram of a wireless communication method according to an embodiment of this application.

FIG. 7 is a schematic diagram of a wireless communication method according to an embodiment of this application. The method includes the following steps.

Step 701: An SMF obtains subnet information of a first subnet corresponding to a first session.

The first session herein may be an IP-type PDU session or an EtherType PDU session.

The subnet information of the first subnet may be represented by "network number+subnet number", or may be represented by "IP address+subnet mask", or may be represented by a result of an operation between an IP address and a subnet mask. For example, the operation between the IP address and the subnet mask may be an "AND" operation between the IP address and the subnet mask. For example, configuration information of an IP address of the first session is 140.252.254.1/24. In this case, the subnet information of the first subnet corresponding to the first session includes a network number and a subnet number of the first subnet, that is, 140.252.254; or includes an IP address and a subnet mask of the first subnet, that is, 140.252.254.1 and 255.255.255.0; or includes a result of an operation between the IP address and the subnet mask of the first subnet, that is, 140.252.254.0/24 (where 140.252.254.0 is a result of perform an "AND" operation between 140.252.254.1 and 255.255.255.0).

FIG. 5 is used as an example. When the first session is the session 1, the session 2, the session 3, or the session 4 in FIG. 5, it is determined that the first subnet corresponding to the first session is the IP subnet 1, and subnet information of the IP subnet 1 is 140.252.254.0/24. When the first session is the session 5, the session 6, or the session 7 in FIG. 5, it is determined that the first subnet corresponding to the first session is the IP subnet 2, and subnet information of the IP subnet 2 is 140.252.253.0/24.

In an implementation method, the SMF may obtain, from a terminal, the subnet information of the first subnet corresponding to the first session. For example, the terminal requests, by using a user plane, a DHCP server or a DN-AAA server to allocate an IP address to the first session, and the DHCP server or the DN-AAA server allocates an IP address to the first session of the terminal based on the request of the terminal, and sends a DHCP response or a DN-AAA response to the terminal via a UPF. The DCHP response or the DN-AAA response carries configuration information of the IP address, so that the terminal can obtain, based on the configuration information of the IP address, the subnet information of the subnet corresponding to the first session. Subsequently, the terminal may actively send, to the SMF, the subnet information of the first subnet corresponding to the first session; or send, to the SMF based on a request of the SMF, the subnet information of the first subnet corresponding to the first session. For example, the terminal sends a NAS message to the SMF, where the NAS message carries an identifier of the first session and the subnet information of the first subnet corresponding to the first session.

In another implementation method, the SMF may alternatively obtain, from a DN-AAA server, the subnet information of the first subnet corresponding to the first session, that is, the DN-AAA server sends, to the SMF, the subnet information of the first subnet corresponding to the first session. Optionally, the SMF further requests, from the DN-AAA server, to obtain the subnet information of the first subnet corresponding to the first session, and the DN-AAA server sends, to the SMF based on the request of the SMF, the subnet information of the first subnet corresponding to the first session. For example, the SMF sends an authentication/authorization request to the DN-AAA server, where the authentication/authorization request carries a generic public subscription identity (generic public subscription identity, GPSI) and a request identifier (request ID) that are of a terminal. The DN-AAA server sends an authentication/authorization reply to the SMF, where the authentication/authorization reply carries an authentication/authorization result, configuration information of an IP address, and a request ID. The SMF stores a correspondence between an identifier of the first session and a request ID. Therefore, the SMF can determine, based on the request ID in the authentication/authorization reply, that the configuration information of the IP address in the authentication/authorization reply corresponds to the first session. Then, the SMF determines subnet information of the IP address based on the configuration information of the IP address. The subnet information is the subnet information of the first subnet corresponding to the first session.

In another implementation method, the SMF may alternatively obtain, from a DHCP server, the subnet information of the first subnet corresponding to the first session, that is, the DHCP server sends, to the SMF, the subnet information of the first subnet corresponding to the first session. Optionally, the SMF further requests, from the DHCP server, to obtain the subnet information of the first subnet corresponding to the first session, and the DHCP server sends, to the SMF based on the request of the SMF, the subnet information of the first subnet corresponding to the first session. For example, the SMF sends a DHCP signaling request to the DHCP server, where the DHCP signaling request carries a transaction identifier. The DHCP server sends a DHCP response to the SMF, where the DHCP response carries configuration information of an IP address and a transaction identifier. The SMF stores a correspondence between an identifier of the first session and a transaction identifier. Therefore, the SMF can determine, based on the transaction identifier in the DHCP response, that the configuration information of the IP address in the DHCP response corresponds to the first session. Then, the SMF determines subnet information of the IP address based on the configuration information of the IP address. The subnet information is the subnet information of the first subnet corresponding to the first session.

In another implementation method, when the first session is an EtherType session, the SMF may further obtain, from a UPF, the subnet information of the first subnet corresponding to the first session. For example, the SMF sends indication information to the UPF. For example, the indication information indicates to detect a data packet used for configuring IP information for the EtherType first session. The UPF determines, based on the indication information, the data packet used for configuring IP information for the first session, where the data packet used for configuring IP information for the first session includes IP information corresponding to the first session, for example, the IP information includes an IP address and a subnet mask of the first session. Then, the UPF sends, to the SMF, the IP information corresponding to the first session; and the SMF determines, based on the IP information corresponding to the first session, the subnet information of the first subnet corresponding to the first session. For example, if the IP information that corresponds to the first session and that is sent by the UPF to the SMF includes an IP address 140.252.254.1 and a subnet mask 255.255.255.0, the SMF determines that the subnet information of the first subnet corresponding to the first session is 140.252.254, or 140.252.254.0/24, or 140.252.254.1 and 255.255.255.0.

Step 702: The UPF obtains, from the SMF, the subnet information of the first subnet corresponding to the first session.

In other words, the SMF sends, to the UPF, the subnet information of the first subnet corresponding to the first session.

In an implementation method, the SMF may send a packet detection rule (packet detection rule, PDR) to the UPF, where the packet detection rule carries the subnet information of the first subnet corresponding to the first session.

In another implementation method, the SMF may send notification information to the UPF, where the notification information carries the subnet information of the first subnet corresponding to the first session.

Step 703: The UPF receives a data packet, where the data packet is a multicast packet or a broadcast packet.

The data packet received by the UPF may be an uplink data packet sent by a terminal or a downlink data packet from a third-party server.

It can be noted that there is no sequence between step 702 and step 703.

Step 704: The UPF determines, based on the subnet information of the first subnet, that the data packet corresponds to the first session.

In an implementation method, the UPF obtains a source IP address in the received data packet, determines subnet information corresponding to the source IP address, and compares the subnet information corresponding to the source IP address with the subnet information of the first subnet corresponding to the first session. If the subnet information of the first subnet corresponding to the first session is the same as the subnet information corresponding to the source IP address, the UPF determines that the data packet corresponds to the first session. To be specific, the UPF stores a correspondence between each session and subnet information of a subnet. After determining the subnet information corresponding to the source IP address in the data packet, the UPF determines, based on the subnet information corresponding to the source IP address and the correspondence, a session corresponding to the subnet information. For example, the source IP address corresponds to the subnet information of the first subnet, and a session corresponding to the subnet information of the first subnet may be referred to as the first session. For example, there may be one or more first sessions corresponding to the data packet.

For example, a method in which the UPF determines the subnet information corresponding to the source IP address may be as follows. The UPF performs an "AND" operation between the source IP address and the subnet mask corresponding to the IP address of the first session, to obtain the subnet information corresponding to the source IP address. It can be noted that, the subnet information corresponding to the source IP address may be actual subnet information of the source IP address, or may not be actual subnet information of the source IP address. With reference to the example in FIG. 5, for example, the source IP address in the received data packet is 140.252.254.6, and an "AND" operation is performed between the source IP address and a subnet mask (that is, 255.255.255.0) corresponding to an IP address of the session 1, to learn that the subnet information corresponding to the source IP address is 140.252.254.0/24, that is, a network number is 140.252 and a subnet number is 254. Then, the subnet information corresponding to the source IP address is compared with subnet information (that is, 140.252.254.0/24, where a network number is 140.252 and a subnet number is 254) corresponding to the session 1, and it is determined that the subnet information of the first subnet corresponding to the session 1 is the same as the subnet information corresponding to the source IP address, so that it is determined that the data packet corresponds to the session 1. Similarly, it may be determined that the data packet corresponds to the session 2, the session 3, and the session 4. An "AND" operation is performed between the source IP address and a subnet mask (that is, 255.255.255.0) corresponding to an IP address of session 5, to learn that the subnet information corresponding to the source IP address is 140.252.254.0/24, that is, a network number is 140.252 and a subnet number is 254. Then the subnet information corresponding to the source IP address is compared with subnet information (that is, 140.252.253.0/24, where a network number is 140.252 and a subnet number is 253) corresponding to the session 5. Because the subnet numbers are different, it is determined that the subnet information of the first subnet corresponding to the session 5 is different from the subnet information corresponding to the source IP address, so that it is determined that the data packet does not correspond to the session 5. Similarly, it may be determined that the data packet does not correspond to the session 6 and the session 7.

In another implementation method, when the first session is an EtherType session, the UPF may obtain an identifier of a first VLAN in the received data packet, and obtain a VLAN set. The VLAN set includes one or more VLANs in the first subnet corresponding to the first session. The UPF determines whether the first VLAN belongs to the VLAN set. If the first VLAN belongs to the VLAN set, the UPF determines that the data packet corresponds to the first session; or if the first VLAN does not belong to the VLAN set, the UPF determines that the data packet does not correspond to the first session. Optionally, the UPF may receive the VLAN set from the SMF. For example, the SMF sends a PDR to the UPF, where the PDR carries the VLAN set. IP addresses of sessions of all terminals in a same VLAN correspond to a same IP subnet, that is, one VLAN corresponds to one IP subnet. IP addresses of sessions of terminals in different VLANs may correspond to a same IP subnet or may correspond to different IP subnets, that is, different VLANs may correspond to a same IP subnet or may correspond to different IP subnets. The following provides description with reference to an example. FIG. 6 is used as an example. If the first session is a session in the VLAN 1, the VLAN 2, the VLAN 3, or the VLAN 4, the first session corresponds to the IP subnet 1; if the first session is a session in the VLAN 5 or the VLAN 6, the first session corresponds to the IP subnet 2; or if the first session is a session in the VLAN 7, the VLAN 8, or the VLAN 9, the first session corresponds to the IP subnet 3. Therefore, if the identifier of the first VLAN in the data packet received by the UPF indicates the VLAN 1, the VLAN 2, the VLAN 3, or the VLAN 4, the UPF determines that the data packet corresponds to sessions in the VLAN 1, the VLAN 2, the VLAN 3, and the VLAN 4; if the identifier of the first VLAN in the data packet received by the UPF indicates the VLAN 5 or the VLAN 6, the UPF determines that the data packet corresponds to sessions in the VLAN 5 and the VLAN 6; or if the identifier of the first VLAN in the data packet received by the UPF indicates the VLAN 7, the VLAN 8, or the VLAN 9, the UPF determines that the data packet corresponds to sessions in the VLAN 7, the VLAN 8, and the VLAN 9.

Step 705: The UPF sends the data packet via the first session.

In other words, the UPF sends the data packet via the first session corresponding to the received data packet. Alternatively, this is understood as: the UPF sends, via the first session, the data packet to a terminal to which the first session belongs.

According to step 701 to step 705, the SMF may obtain a correspondence between the first session and the subnet information of the first subnet; and then the SMF configures, for the UPF, the correspondence between the first session and the subnet information of the first subnet, so that the UPF can send a received multicast packet or broadcast packet based on an IP subnet granularity via a corresponding session. This method can be used to precisely send a data packet.

To help understand the technical solution content in this application, the following further describes the foregoing technical solution with reference to four different specific embodiments. The following embodiments in FIG. 8 to FIG. 11 are specific implementations of the embodiment in FIG. 7.

In the following examples, an example in which the first session is an IP-type PDU session or an EtherType PDU session is used for description.

Figure 8:
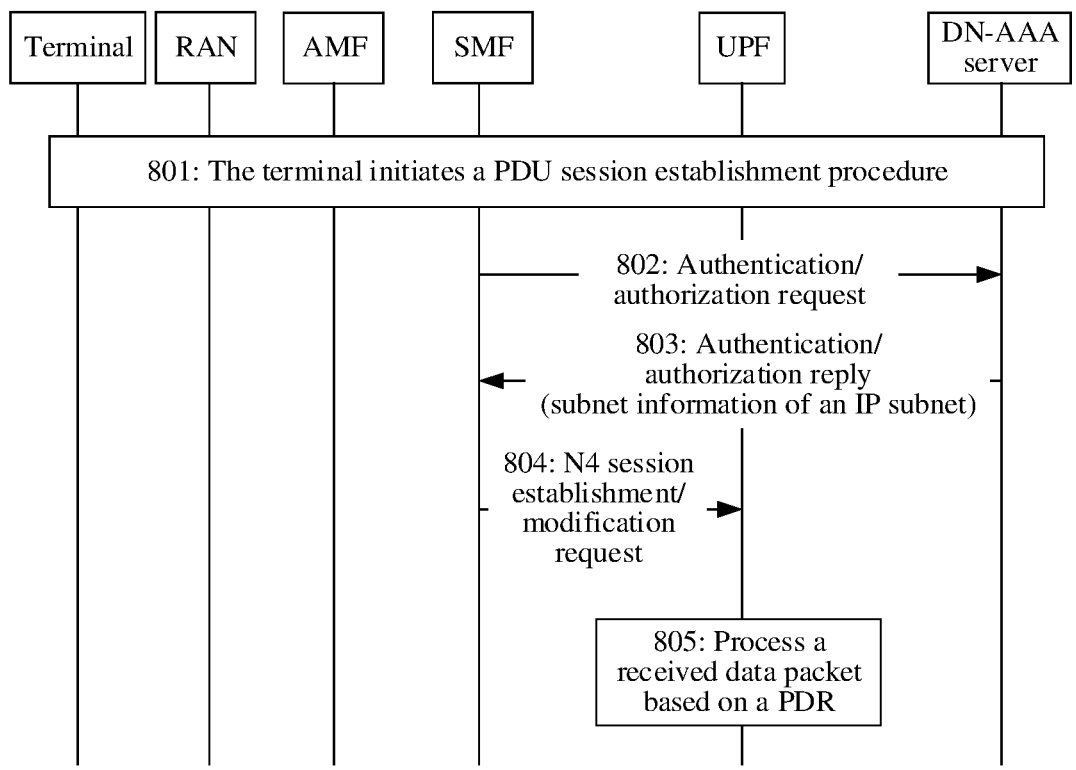
FIG. 8 is a schematic diagram of a wireless communication method according to an embodiment of this application.

FIG. 8 is a schematic diagram of a wireless communication method according to an embodiment of this application. The method includes the following steps.

Step 801: A terminal initiates a PDU session establishment procedure.

Step 802: In the PDU session establishment procedure, an SMF sends an authentication/authorization request to a DN-AAA server. Correspondingly, the DN-AAA server receives the authentication/authorization request.

The authentication/authorization request may carry a GPSI, a request ID, and the like of the terminal.

Step 803: The DN-AAA server sends an authentication/authorization reply to the SMF. Correspondingly, the SMF receives the authentication/authorization reply.

The authentication/authorization reply carries an authentication/authorization result, configuration information of an IP address, and a request ID. The configuration information of the IP address includes an IP address and an IP subnet mask of a PDU session.

The SMF stores a correspondence between an identifier of the PDU session and a request ID. Therefore, the SMF can determine, based on the request ID in the authentication/authorization reply, that the configuration information of the IP address in the authentication/authorization reply corresponds to the PDU session. Then, the SMF determines subnet information of the IP address based on the configuration information of the IP address. The subnet information is subnet information of an IP subnet corresponding to the PDU session.

Step 804: The SMF sends an N4 session establishment/modification request to a UPF. Correspondingly, the UPF receives the N4 session establishment/modification request.

The N4 session establishment/modification request carries a PDR, and the PDR includes the subnet information of the IP subnet corresponding to the PDU session. Because one PDR corresponds to one PDU session, subnet information included in a PDR of a PDU session is subnet information corresponding to the PDU session.

It can be noted that, when the subnet information in the PDR includes an IP network number and an IP subnet number of the PDU session, the UPF may determine the IP subnet mask based on the IP network number and the IP subnet number.

Step 805: The UPF processes a received data packet based on the PDR.

In an implementation method, the UPF obtains a destination IP address in the received data packet, and determines whether the data packet is a multicast packet or a broadcast packet in a subnet. If the data packet is a multicast packet or a broadcast packet in a subnet, the UPF obtains a source IP address in the data packet, and then performs an AND operation between the source IP address and a subnet mask of the PDU session, to derive an IP network number and an IP subnet number that correspond to the source IP address in the data packet. Then, the UPF respectively compares the IP network number and the IP subnet number corresponding to the source IP address with the IP network number and the IP subnet number of the PDU session. If the IP network number corresponding to the source IP address is the same as the IP network number of the PDU session, and the IP subnet number corresponding to the source IP address is the same as the IP subnet number of the PDU session, the UPF replicates the data packet and sends the data packet to the PDU session. If the IP network number corresponding to the source IP address is different from the IP network number of the PDU session, or the IP subnet number corresponding to the source IP address is different from the IP subnet number of the PDU session, the UPF does not forward the data packet to the PDU session.

For example, IP addresses of a PDU session 1 and a PDU session 2 of a terminal 1 are respectively 140.252.255.1 and 140.252.255.2; IP addresses of a PDU session 3 and a PDU session 4 of a terminal 2 are respectively 140.252.255.3 and 140.252.255.4; and IP addresses of a PDU session 5 and a PDU session 6 of a terminal 3 are respectively 140.252.254.1 and 140.252.254.2. In addition, subnet masks of these PDU sessions all are 255.255.255.0. When the SMF configures a PDR for the UPF, each PDR includes subnet information of an IP subnet corresponding to a PDU session. For example, a PDR 1 includes 140.252.255.1 and 255.255.255.0, and the PDR 1 corresponds to the PDU session 1; a PDR 2 includes 140.252.255.2 and 255.255.255.0, and the PDR 2 corresponds to the PDU session 2; a PDR 3 includes 140.252.255.3 and 255.255.255.0, and the PDR 3 corresponds to the PDU session 3; a PDR 4 includes 140.252.255.4 and 255.255.255.0, and the PDR 4 corresponds to the PDU session 4; a PDR 5 includes 140.252.254.1 and 255.255.255.0, the PDR 5 corresponds to the PDU session 5; a PDR 6 includes 140.252.254.2 and 255.255.255.0, and the PDR 6 corresponds to the PDU session 6.

When receiving a data packet, the UPF first determines, based on a destination IP address in the data packet, whether the data packet is a multicast packet or a broadcast packet. For example, if the destination IP address belongs to one of 224.0.0.0 to 239.255.255.255, it is determined that the data packet is a multicast packet. For another example, if the destination IP address is one of the four broadcast IP addresses described above, it is determined that the data packet is a broadcast packet. When determining that the data packet is a multicast packet or a broadcast packet, the UPF obtains a source IP address in the data packet, and then separately matches the source IP address with the foregoing PDRs.

For example, if the source IP address is 140.252.255.5, the UPF first performs an AND operation between 140.252.255.5 and the subnet mask 255.255.255.0 in the PDR 1, to learn that an IP network number corresponding to the source IP address is 140.252 and an IP subnet number corresponding to the source IP address is 255. Then, the UPF respectively compares the IP network number (that is, 140.252) and the IP subnet number (that is, 255) corresponding to the source IP address with an IP network number and an IP subnet number in the IP subnet information in the PDR 1, and determines that both the IP network numbers and the IP subnet numbers are the same. Therefore, the UPF determines that the source IP address matches the PDU session 1 corresponding to the PDR 1, and forwards the data packet to the PDU session 1 corresponding to the PDR 1. Similarly, the UPF further forwards the data packet to the PDU session 2 corresponding to the PDR 2, the PDU session 3 corresponding to the PDR 3, and the PDU session 4 corresponding to the PDR 4.

For another example, if the source IP address is 140.252.254.3, the UPF first performs an AND operation between 140.252.254.3 and the subnet mask 255.255.255.0 in the PDR 1, to learn that an IP network number corresponding to the source IP address is 140.252 and an IP subnet number corresponding to the source IP address is 254. Then, the UPF respectively compares the IP network number (that is, 140.252) and the IP subnet number (that is, 254) corresponding to the source IP address with an IP network number and an IP subnet number in the IP subnet information in the PDR 1, and determines that the IP subnet numbers are different. Therefore, the UPF determines that the source IP address does not match the PDU session 1 corresponding to the PDR 1, and does not forward the data packet to the PDU session 1 corresponding to the PDR 1. Similarly, the UPF does not forward the data packet to the PDU session 2 corresponding to the PDR 2, the PDU session 3 corresponding to the PDR 3, or the PDU session 4 corresponding to the PDR 4, either. However, the UPF determines that the source IP address matches the PDU session 5 corresponding to the PDR 5 and matches the PDU session 6 corresponding to the PDR 6, and the UPF forwards the data packet to the PDU session 5 corresponding to the PDR 5 and the PDU session 6 corresponding to the PDR 6.

In another implementation method, the UPF obtains a destination IP address in the received data packet, and determines whether the data packet is a multicast packet or a broadcast packet in a subnet. If the data packet is a multicast packet or a broadcast packet in a subnet, the UPF obtains a source IP address in the data packet, and then performs an AND operation between the source IP address and a subnet mask of the PDU session, to derive subnet information corresponding to the source IP address in the data packet. Then, the UPF compares the subnet information corresponding to the source IP address with the subnet information corresponding to the PDU session. If the subnet information corresponding to the source IP address is the same as the subnet information corresponding to the PDU session, the UPF replicates the data packet and forwards the data packet to the PDU session. If the subnet information corresponding to the source IP address is different from the subnet information corresponding to the PDU session, the UPF does not forward the data packet to the PDU session. In this method, an IP network number and an IP subnet number in subnet information are not separately distinguished. Instead, the subnet information corresponding to the source IP address is used as a whole, the subnet information corresponding to the PDU session is used as a whole, and the two pieces of subnet information are compared. For example, if the source IP address is 140.252.255.5, the UPF first performs an AND operation between 140.252.255.5 and the subnet mask 255.255.255.0 in the example PDR 1, to learn that the subnet information corresponding to the source IP address is 140.252.255.0/24. Then, the UPF compares the subnet information (that is, 140.252.255.0/24) corresponding to the source IP address with the subnet information (that is, 140.252.255.0/24) corresponding to the PDR 1, and determines that the two pieces of subnet information are the same. Therefore, the UPF determines that the source IP address matches the PDU session 1 corresponding to the PDR 1, and forwards the data packet to the PDU session 1 corresponding to the PDR 1. Similarly, the UPF further forwards the data packet to the PDU session 2 corresponding to the PDR 2, the PDU session 3 corresponding to the PDR 3, and the PDU session 4 corresponding to the PDR 4.

In the foregoing embodiment, the SMF obtains a correspondence between the subnet information of the IP subnet and the PDU session based on the subnet information that is provided by the DN-AAA server and that is of the IP subnet corresponding to the PDU session of the terminal; and then the SMF configures, for the UPF by using the PDR, the correspondence between the subnet information of the IP subnet and the PDU session, so that the UPF can send a received multicast packet or broadcast packet to a corresponding PDU session based on an IP subnet granularity.

Figure 9:
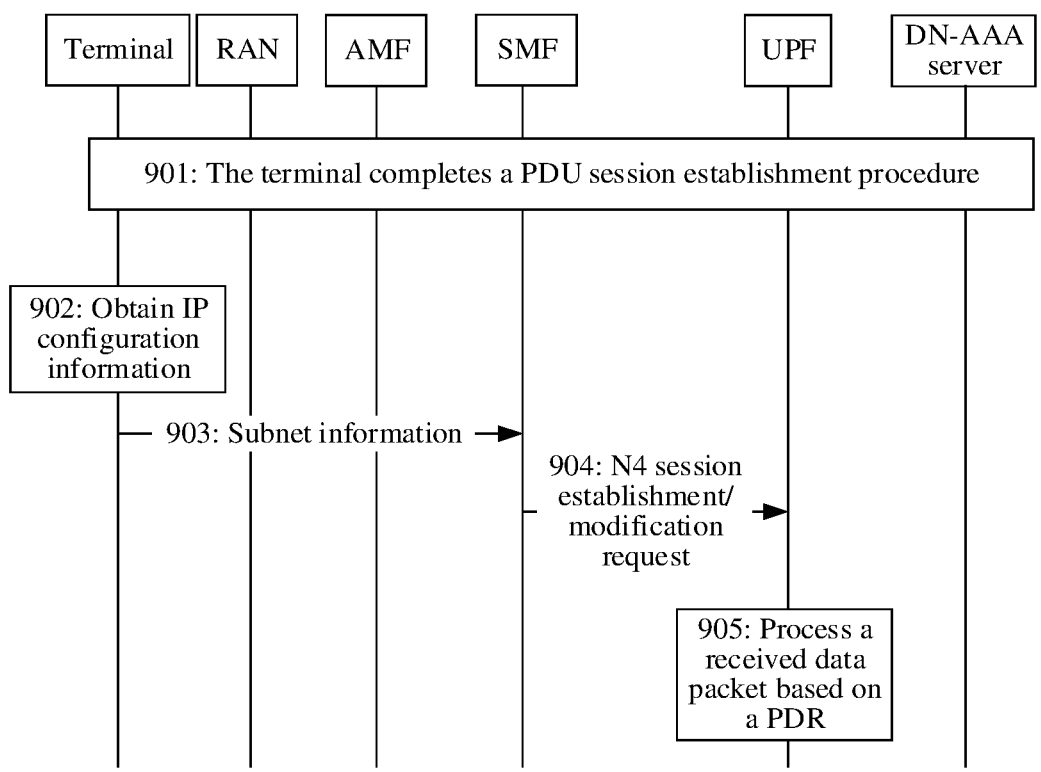
FIG. 9 is a schematic diagram of a wireless communication method according to an embodiment of this application.

FIG. 9 is a schematic diagram of a wireless communication method according to an embodiment of this application. The method includes the following steps.

Step 901: A terminal completes a PDU session establishment procedure.

Step 902: The terminal obtains IP configuration information, including an IP address and an IP subnet mask of a PDU session.

For example, a DN-AAA server or a DHCP server may allocate an IP address to the terminal, and send the IP configuration information to the terminal.

Step 903: The terminal sends, to an SMF, subnet information of an IP subnet corresponding to the PDU session. Correspondingly, the SMF receives the subnet information of the IP subnet corresponding to the PDU session.

The subnet information includes an IP address and an IP subnet mask, or includes an IP network number and an IP subnet number.

Step 904 and step 905 are the same as step 804 and step 805, and reference may be made to the foregoing description.

In the foregoing embodiment, the SMF obtains a correspondence between the subnet information of the IP subnet and the PDU session based on the subnet information that is of the IP subnet corresponding to the PDU session and that is provided by the terminal; and then the SMF configures, for a UPF by using a PDR, the correspondence between the subnet information of the IP subnet and the PDU session, so that the UPF can send a received multicast packet or broadcast packet to a corresponding PDU session based on an IP subnet granularity.

Figure 10:
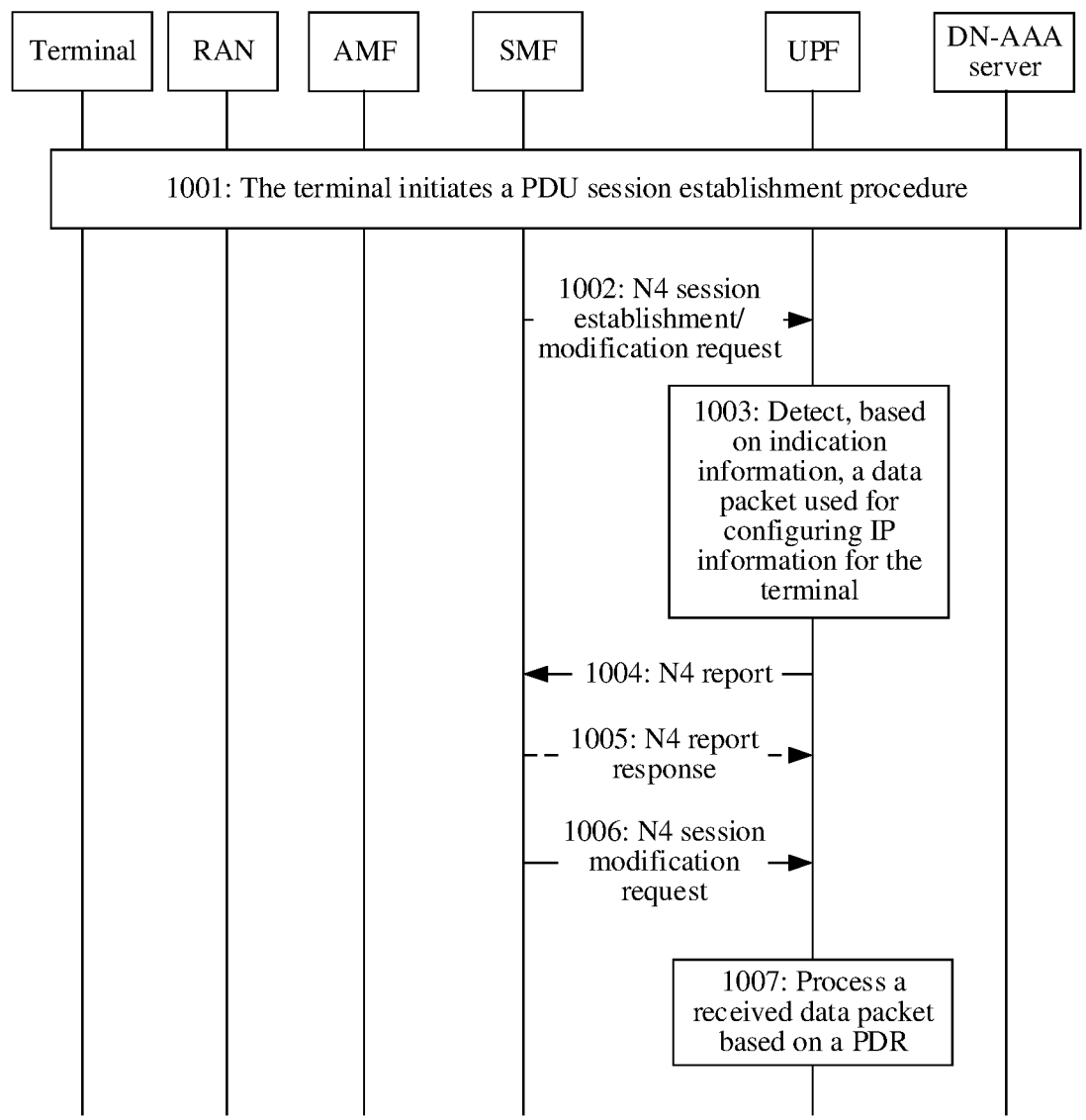
FIG. 10 is a schematic diagram of a wireless communication method according to an embodiment of this application.

FIG. 10 is a schematic diagram of a wireless communication method according to an embodiment of this application. The method includes the following steps.

Step 1001: A terminal initiates a PDU session establishment procedure.

A PDU session may be an EtherType PDU session.

Step 1002: An SMF sends an N4 session establishment/modification request to a UPF, where the N4 session establishment/modification request carries indication information. Correspondingly, the UPF receives the N4 session establishment/modification request.

For example, the indication information may indicate the UPF to detect a data packet used for configuring IP information for the terminal; or the indication information is used to request configuration information of an IP address; or the indication information may include a MAC address of a PDU session of the terminal, so as to indicate the UPF to detect a data packet including the MAC address. It can be noted that the SMF sends the indication information to the UPF for only a PDU session to which an IP address needs to be allocated. The indication information may be, for example, information about a specific field in the N4 session establishment/modification request.

Step 1003: The UPF detects, based on the indication information, a data packet used for configuring IP information for a session of the terminal.

For example, the terminal requests, by using the UPF, a DHCP server to allocate an IP address. The DHCP server allocates an IP address to the terminal based on the request of the terminal, and sends a DHCP response to the terminal by using the UPF. The DCHP response carries configuration information of the IP address (or referred to as IP information). In this case, the UPF may detect, based on the indication information, the data packet used for configuring IP information for a session of the terminal, that is, a data packet carrying the DHCP response.

After detecting the data packet used for configuring IP information for a session of the terminal, the UPF may obtain the IP information from the data packet. The IP information includes, for example, an IP address and an IP subnet mask of the PDU session.

Step 1004: The UPF sends an N4 report to the SMF, where the N4 report carries IP information. Correspondingly, the SMF receives the N4 report.

There is a one-to-one correspondence between the N4 report and the PDU session. Therefore, when the IP information is sent to the SMF by using the N4 report, the SMF can determine a correspondence between the PDU session and the IP information based on the N4 report and the IP information in the N4 report.

Step 1005: The SMF sends an N4 report response to the UPF. Correspondingly, the UPF receives the N4 report response.

This step is optional.

Step 1006. The SMF sends an N4 session modification request to the UPF. Correspondingly, the UPF receives the N4 session modification request.

The N4 session modification request carries one or more PDRs, and each PDR includes subnet information of an IP subnet corresponding to the PDU session.

It can be noted that, when the subnet information in the PDR includes an IP network number and an IP subnet number of the PDU session, the UPF may determine the IP subnet mask based on the IP network number and the IP subnet number.

Step 1007 is the same as step 805, and reference may be made to the foregoing description.

In the foregoing embodiment, the SMF indicates the UPF to detect the data packet used for configuring IP information for the terminal, and obtains the correspondence between the subnet information of the IP subnet and the PDU session based on the IP information reported by the UPF by using the N4 report corresponding to the PDU session; and then the SMF configures, for the UPF by using the PDR, the correspondence between the subnet information of the IP subnet and the PDU session, so that the UPF can send a received multicast packet or broadcast packet to a corresponding PDU session based on an IP subnet granularity.

Figure 11:
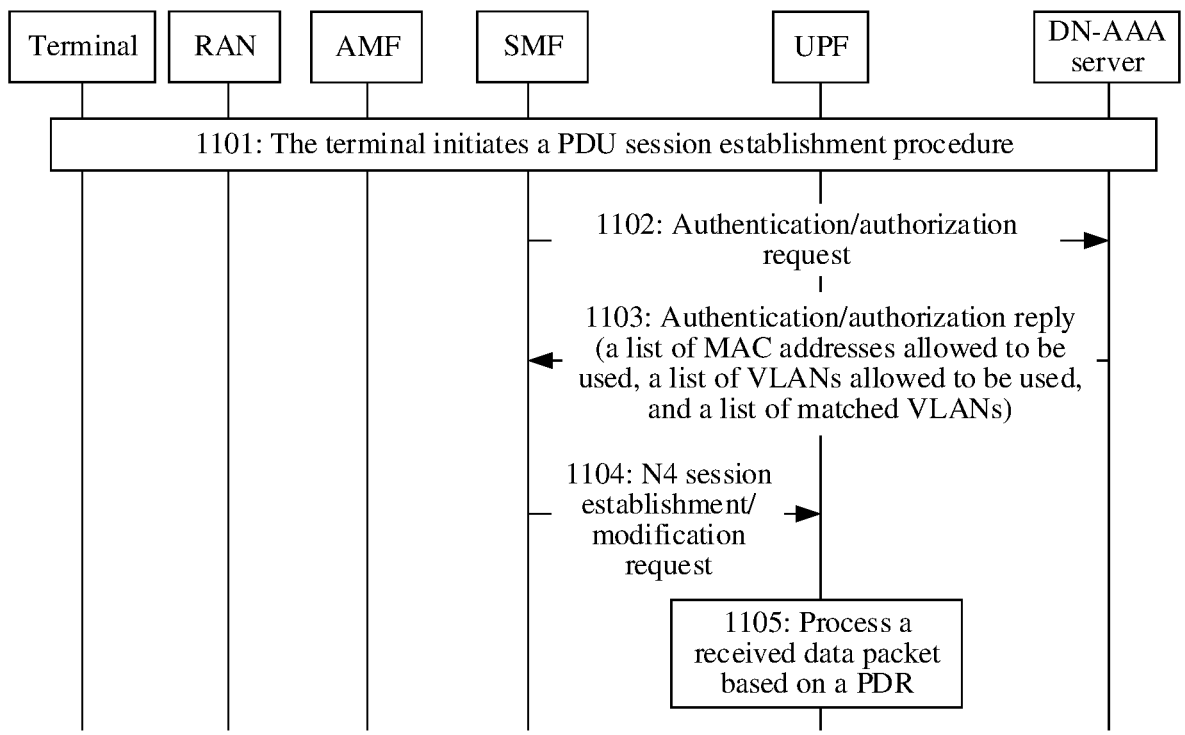
FIG. 11 is a schematic diagram of a wireless communication method according to an embodiment of this application.

FIG. 11 is a schematic diagram of a wireless communication method according to an embodiment of this application. The method includes the following steps.

Step 1101: A terminal initiates a PDU session establishment procedure.

A PDU session may be an EtherType PDU session.

Step 1102: An SMF sends an authentication/authorization request to a DN-AAA server. Correspondingly, the DN-AAA server receives the authentication/authorization request.

Step 1103: The DN-AAA server sends an authentication/authorization reply to the SMF. Correspondingly, the SMF receives the authentication/authorization reply.

The authentication/authorization reply carries the following lists corresponding to the PDU session: a list of MAC addresses allowed to be used, a list of VLANs allowed to be used, and a list of matched VLANs.

The list of MAC addresses allowed to be used includes one or more MAC addresses.

The list of VLANs allowed to be used includes an identifier (for example, a VLAN ID) of one or more VLANs allowed to be used by the terminal. When the list of VLANs allowed to be used includes identifiers of a plurality of VLANs, IP addresses of PDU sessions of terminals in the plurality of VLANs correspond to a same IP subnet, that is, one list of VLANs allowed to be used corresponds to one IP subnet.

The list of matched VLANs includes identifiers (for example, VLAN IDs) of all VLANs in an IP subnet, and the IP subnet is an IP subnet corresponding to the list of VLANs allowed to be used.

A relationship between the list of matched VLANs and the list of VLANs allowed to be used is as follows. Identifiers of VLANs in the list of VLANs allowed to be used are a part of identifiers of VLANs in the list of matched VLANs, or identifiers of VLANs in the list of VLANs allowed to be used are the same as identifiers of VLANs in the list of matched VLANs. FIG. 6 is used as an example. Assuming that the list of VLANs allowed to be used includes a VLAN ID 1, the list of matched VLANs includes the VLAN ID 1, a VLAN ID 2, a VLAN ID 3, and a VLAN ID 4. For another example, assuming that the list of VLANs allowed to be used includes a VLAN ID 7 and a VLAN ID 8, the list of matched VLANs includes the VLAN ID 7, the VLAN ID 8, and a VLAN ID 9.

The SMF may send, to the terminal, the list of MAC addresses allowed to be used and the list of VLANs allowed to be used, so that the terminal selects a MAC address for use from the list of MAC addresses allowed to be used, and selects a VLAN for use from the list of VLANs allowed to be used.

Step 1104: The SMF sends an N4 session establishment/modification request to a UPF. Correspondingly, the UPF receives the N4 session establishment/modification request.

The N4 session establishment/modification request carries a PDR, and the PDR includes the list of matched VLANs that corresponds to the PDU session.

Step 1105: The UPF processes a received data packet based on the PDR.

The UPF obtains a destination MAC address in the received data packet, and determines whether the data packet is a multicast packet or a broadcast packet. If the data packet is a multicast packet or a broadcast packet, the UPF detects an EtherType field in the data packet; determines, based on a value of the EtherType field, that the data packet is an IP data packet based on an EtherType service; and obtains a destination IP address in the data packet, and determines, based on the destination IP address, whether the data packet is a multicast packet or a broadcast packet in a subnet. If the data packet is a multicast packet or a broadcast packet in a subnet, the UPF obtains a VLAN ID from the data packet, and if the UPF determines that the VLAN ID belongs to the list of matched VLANs in the PDR, the UPF replicates the data packet and forwards the data packet to the PDU session corresponding to the PDR; or if the VLAN ID does not belong to the list of matched VLANs in the PDR, the UPF does not forward the data packet to the PDU session.

In the foregoing embodiment, the SMF configures, for the UPF by using the PDR based on the list of matched VLANs that is provided by the DN-AAA server and that corresponds to the PDU session, the list of matched VLANs that corresponds to the PDU session. One list of matched VLANs corresponds to one IP subnet, so that the UPF can send a received multicast packet or broadcast packet to a corresponding PDU session based on an IP subnet granularity.

It may be understood that, to implement the functions in the foregoing embodiments, the UPF, the SMF, the DN-AAA server, and the terminal include corresponding hardware structures and/or software modules for performing the functions. A person skilled in the art can be easily aware that, units and method steps in the examples described with reference to the embodiments disclosed in this application can be implemented in this application in a form of hardware or a combination of hardware and computer software. Whether a function is performed by hardware or hardware driven by computer software depends on particular application scenarios and design constraint conditions of the technical solutions.

Figure 12:
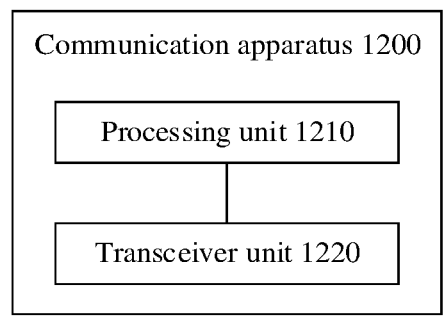
FIG. 12 is a schematic diagram of a communication apparatus according to an embodiment of this application.
Figure 13:
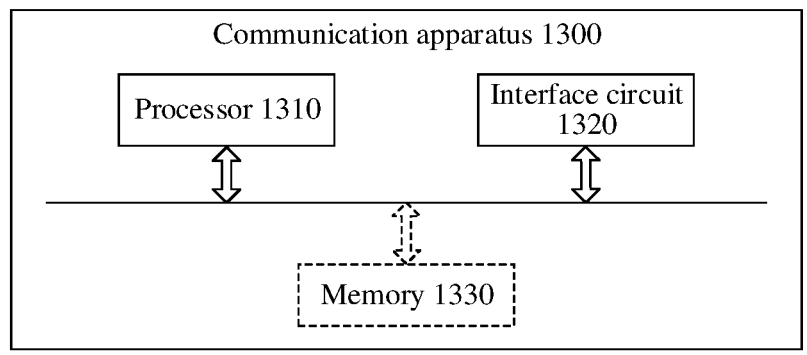
FIG. 13 is a schematic diagram of a communication apparatus according to an embodiment of this application.

FIG. 12 and FIG. 13 are schematic diagrams of structures of possible communication apparatuses according to embodiments of this application. These communication apparatuses may be configured to implement functions of the terminal, the UPF, the SMF, or the DN-AAA server in the foregoing method embodiments, and therefore can also achieve beneficial effects of the foregoing method embodiments. In embodiments of this application, the communication apparatus may be the terminal shown in FIG. 1(*a*) or FIG. 1(*b*), may be the UPF shown in FIG. 1(*a*) or FIG. 1(*b*), may be the SMF shown in FIG. 1(*a*) or FIG. 1(*b*), may be a module (for example, a chip) used in a terminal, a UPF, or an SMF, or may be a DN-AAA server or a module (for example, a chip) used in a DN-AAA server.

As shown in FIG. 12, a communication apparatus 1200 includes a processing unit 1210 and a transceiver unit 1220. The communication apparatus 1200 is configured to implement functions of the terminal, the UPF, the SMF, or the DN-AAA server in the method embodiments shown in FIG. 7 to FIG. 11.

When the communication apparatus 1200 is configured to implement the functions of the UPF in the method embodiments shown in FIG. 7 to FIG. 11, the transceiver unit 1220 is configured to: receive a data packet, where the data packet is a multicast packet or a broadcast packet; and send the data packet by using a first session; and the processing unit 1210 is configured to: obtain subnet information of a first subnet corresponding to the first session; and determine, based on the subnet information, that the data packet corresponds to the first session in the first subnet.

In a possible implementation method, the processing unit 1210 is specifically configured to: determine subnet information corresponding to a source IP address in the data packet; and if the subnet information corresponding to the first session is the same as the subnet information corresponding to the source IP address, determine that the data packet corresponds to the first session.

In a possible implementation method, the processing unit 1210 is specifically configured to receive a packet detection rule from a session management network element by using the transceiver unit 1220, where the packet detection rule includes the subnet information.

In a possible implementation method, the transceiver unit 1220 is further configured to: receive indication information from the session management network element; and send IP information to the session management network element, where the IP information is used to determine the subnet information. The processing unit 1210 is further configured to detect, based on the indication information, a data packet used for configuring IP information for the first session, where the data packet used for configuring IP information for the first session includes the IP information corresponding to the first session, and the first session is an EtherType session.

In a possible implementation method, the processing unit 1210 is specifically configured to: obtain an identifier of a first VLAN in the data packet; obtain a VLAN set, where the VLAN set includes one or more VLANs in the first subnet; and if the first VLAN belongs to the VLAN set, determine that the data packet corresponds to the first session.

In a possible implementation method, the processing unit 1210 is specifically configured to receive a packet detection rule from a session management network element by using the transceiver unit 1220, where the packet detection rule includes the VLAN set.

When the communication apparatus 1200 is configured to implement the functions of the SMF in the method embodiments shown in FIG. 7 to FIG. 11, the processing unit 1210 is configured to obtain subnet information of a first subnet corresponding to a first session; and the transceiver unit 1220 is configured to send the subnet information to a user plane network element, where the subnet information is used to detect a data packet that matches the subnet information.

In a possible implementation method, the transceiver unit 1220 is specifically configured to send a packet detection rule to the user plane network element, where the packet detection rule includes the subnet information.

In a possible implementation method, the processing unit 1210 is specifically configured to: send indication information to the user plane network element by using the transceiver unit 1220, where the indication information indicates to detect a data packet used for configuring IP information for the first session, and the first session is an EtherType session; receive, by using the transceiver unit 1220 from the user plane network element, IP information corresponding to the first session; and determine the subnet information based on the IP information.

In a possible implementation method, the processing unit 1210 is specifically configured to receive the subnet information from an authentication, authorization and accounting server by using the transceiver unit 1220.

In a possible implementation method, the transceiver unit 1220 is further configured to request the subnet information from the authentication, authorization and accounting server.

In a possible implementation method, the processing unit 1210 is specifically configured to receive the subnet information from a terminal by using the transceiver unit 1220.

When the communication apparatus 1200 is configured to implement the functions of the terminal in the method embodiments shown in FIG. 7 to FIG. 11, the processing unit 1210 is configured to obtain subnet information of a first subnet corresponding to a first session; and the transceiver unit 1220 is configured to send the subnet information to a session management network element, where the subnet information is used to detect a data packet that matches the subnet information.

In a possible implementation method, the processing unit 1210 is specifically configured to receive the subnet information from an authentication, authorization and accounting server or a DHCP server by using the transceiver unit 1220.

When the communication apparatus 1200 is configured to implement the functions of the DN-AAA server in the method embodiments shown in FIG. 7 to FIG. 11, the processing unit 1210 is configured to obtain subnet information of a first subnet corresponding to a first session; and the transceiver unit 1220 is configured to send the subnet information to a session management network element, where the subnet information is used to detect a data packet that matches the subnet information.

For more detailed descriptions of the processing unit 1210 and the transceiver unit 1220, directly refer to related descriptions in the method embodiments shown in FIG. 7 to FIG. 11. Details are not described herein again.

As shown in FIG. 13, a communication apparatus 1300 includes a processor 1310 and an interface circuit 1320. The processor 1310 and the interface circuit 1320 are coupled to each other. It may be understood that the interface circuit 1320 may be a transceiver or an input/output interface. Optionally, the communication apparatus 1300 may further include a memory 1330, configured to store instructions executed by the processor 1310, store input data required by the processor 1310 to run instructions, or store data generated after the processor 1310 runs instructions.

When the communication apparatus 1300 is configured to implement the methods shown in FIG. 7 to FIG. 11, the processor 1310 is configured to implement functions of the processing unit 1210, and the interface circuit 1320 is configured to implement functions of the transceiver unit 1220.

When the communication apparatus is a chip used in a terminal, the chip implements functions of the terminal in the foregoing method embodiments. The chip receives information from another module (for example, a radio frequency module or an antenna) in the terminal, where the information is sent by a base station to the terminal; or the chip sends information to another module (for example, a radio frequency module or an antenna) in the terminal, where the information is sent by the terminal to a base station.

When the communication apparatus is a chip used in a UPF, the chip implements functions of the UPF in the foregoing method embodiments. The chip receives information from another module in the UPF, where the information is sent by another device to the UPF; or the chip sends information to another module in the UPF, where the information is sent by the UPF to another device.

When the communication apparatus is a chip used in an SMF, the chip implements functions of the SMF in the foregoing method embodiments. The chip receives information from another module in the SMF, where the information is sent by another device to the SMF; or the chip sends information to another module in the SMF, where the information is sent by the SMF to another device.

When the communication apparatus is a chip used in a DN-AAA server, the chip implements functions of the DN-AAA server in the foregoing method embodiments. The chip receives information from another module in the DN-AAA server, where the information is sent by another device to the DN-AAA server; or the chip sends information to another module in the DN-AAA server, where the information is sent by the DN-AAA server to another device.

It may be understood that, the processor in embodiments of this application may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The general-purpose processor may be a microprocessor or may be any conventional processor.

The method steps in embodiments of this application may be implemented by using hardware, or may be implemented by a processor by executing software instructions. The software instructions may include a corresponding software module, and the software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium known in the art. An example storage medium is coupled to the processor, so that the processor can read information from the storage medium and can write information to the storage medium. Certainly, the storage medium may alternatively be a component of the processor. The processor and the storage medium may be located in an ASIC.

All or some of the foregoing embodiments may be implemented by using software, hardware, firmware, or any combination thereof. When software is used for implementation, the embodiments may be entirely or partially implemented in a form of a computer program product. The computer program product includes one or more computer programs or instructions. When the computer program or the instruction is loaded and executed on a computer, all or some of the procedures or functions according to embodiments of this application are performed. The computer may be a general-purpose computer, a dedicated computer, a computer network, a base station, user equipment, or another programmable apparatus. The computer program or the instruction may be stored in a computer-readable storage medium, or may be transmitted from one computer-readable storage medium to another computer-readable storage medium. For example, the computer program or the instruction may be transmitted from one website, computer, server, or data center to another website, computer, server, or data center in a wired or wireless manner. The computer-readable storage medium may be any available medium accessible by a computer or a data storage device, such as a server, a data center, or the like, that integrates one or more available media. The available medium may be a magnetic medium, for example, a floppy disk, a hard disk, or a magnetic tape; may be an optical medium, for example, a digital video disc; or may be a semiconductor medium, for example, a solid state disk. The computer-readable storage medium may be a volatile storage medium or a non-volatile storage medium, or may include both a volatile storage medium and a non-volatile storage medium.

In embodiments of this application, unless otherwise specially stated or there is a logic conflict, terms and/or descriptions between different embodiments are consistent and may be mutually referenced, and technical features in different embodiments may be combined based on an internal logical relationship of the embodiments, to form a new embodiment.

In this application, "at least one" means one or more, and "a plurality of" means two or more; and "and/or" describes an association relationship between associated objects, and indicates that three relationships may exist. For example, "A and/or B" may indicate the following cases: Only A exists, both A and B exist, and only B exists, where A and B may be singular or plural. In the text description of this application, the character "/" usually indicates an "or" relationship between associated objects. In the formula in this application, the character "/" indicates a "division" relationship between associated objects.

It may be understood that various numerical numbers in embodiments of this application are merely used for differentiation for ease of description, and are not used to limit the scope of embodiments of this application. Sequence numbers of the foregoing processes do not mean execution sequences. The execution sequences of the processes should be determined based on functions and internal logic of the processes.

What is claimed is:

1. A method, comprising:
   obtaining subnet information of a first subnet corresponding to a first session;
   receiving a data packet, wherein the data packet is a multicast packet or a broadcast packet;
   determining, based on the subnet information of the first subnet, that the data packet corresponds to the first session in the first subnet; and
   sending the data packet via the first session.

2. The method according to claim 1, wherein determining, based on the subnet information of the first subnet, that the data packet corresponds to the first session in the first subnet comprises:
   determining subnet information corresponding to a source Internet Protocol (IP) address in the data packet; and
   when the subnet information of the first subnet that corresponds to the first session is the same as the subnet information corresponding to the source IP address, determining that the data packet corresponds to the first session.

3. The method according to claim 1, wherein obtaining the subnet information of the first subnet corresponding to the first session comprises:
   receiving a packet detection rule from a session management network element, wherein the packet detection rule comprises the subnet information of the first subnet.

4. The method according to claim 3, further comprising:
   receiving indication information from the session management network element;
   detecting, based on the indication information, a data packet used for configuring IP information for the first session, wherein the data packet used for configuring IP information for the first session comprises IP information corresponding to the first session, and the first session is an EtherType session; and
   sending the IP information to the session management network element, wherein the IP information is used to determine the subnet information of the first subnet.

5. The method according to claim 1, wherein determining, based on the subnet information of the first subnet, that the data packet corresponds to the first session in the first subnet comprises:
   obtaining, from the data packet, an identifier of a first virtual local area network (VLAN);
   obtaining a VLAN set, wherein the VLAN set comprises one or more VLANs in the first subnet; and
   when the first VLAN belongs to the VLAN set, determining that the data packet corresponds to the first session.

6. The method according to claim 5, wherein obtaining the VLAN set comprises:
   receiving a packet detection rule from a session management network element, wherein the packet detection rule comprises the VLAN set.

7. The method according to claim 1 further comprising:
   sending the subnet information of the first subnet to a user plane network element.

8. The method according to claim 7, wherein sending the subnet information of the first subnet to the user plane network element comprises:
   sending a packet detection rule to the user plane network element, wherein the packet detection rule comprises the subnet information of the first subnet.

9. The method according to claim 7 further comprising:
   sending indication information to the user plane network element, wherein the indication information indicates to detect a data packet used for configuring internet protocol (IP) information corresponding to the first session, and the first session is an EtherType session;
   receiving, from the user plane network element, the IP information corresponding to the first session; and
   determining the subnet information of the first subnet based on the IP information.

10. A method, comprising:
    obtaining subnet information of a first subnet corresponding to a first session; and
    sending the subnet information of the first subnet to a user plane network element, wherein the subnet information is used to detect a data packet that matches the subnet information of the first subnet.

11. The method according to claim 10, wherein sending the subnet information of the first subnet to the user plane network element comprises:
    sending a packet detection rule to the user plane network element, wherein the packet detection rule comprises the subnet information of the first subnet.

12. The method according to claim 10, wherein obtaining the subnet information of the first subnet corresponding to a first session comprises:
    sending indication information to the user plane network element, wherein the indication information indicates to detect a data packet used for configuring internet protocol (IP) information corresponding to the first session, and the first session is an EtherType session;

receiving, from the user plane network element, the IP information corresponding to the first session; and determining the subnet information of the first subnet based on the IP information.

13. The method according to claim 10, wherein obtaining the subnet information of the first subnet corresponding to the first session comprises:

receiving the subnet information of the first subnet from an authentication, authorization and accounting server.

14. The method according to claim 13, further comprising:

requesting the subnet information of the first subnet from the authentication, authorization and accounting server.

15. The method according to claim 10, wherein obtaining the subnet information of the first subnet corresponding to the first session comprises:

receiving the subnet information of the first subnet from a terminal.

16. The method according to claim 10 further comprising:

receiving a data packet, wherein the data packet is a multicast packet or a broadcast packet;

determining, based on the subnet information of the first subnet, that the data packet corresponds to the first session in the first subnet; and sending the data packet via the first session.

17. The method according to claim 16, wherein determining, based on the subnet information of the first subnet, that the data packet corresponds to the first session in the first subnet comprises:

determining subnet information corresponding to a source Internet Protocol (IP) address in the data packet; and when the subnet information of the first subnet corresponding to the first session is the same as the subnet information corresponding to the source IP address, determining that the data packet corresponds to the first session.

18. The method according to claim 10, further comprising:

receiving a packet detection rule from a session management network element, wherein the packet detection rule comprises the subnet information of the first subnet.

19. A method, comprising:

obtaining subnet information of a first subnet corresponding to a first session; and sending the subnet information of the first subnet to a session management network element, wherein the subnet information is used to detect a data packet that matches the subnet information of the first subnet.

20. The method according to claim 19, wherein obtaining the subnet information of the first subnet corresponding to the first session comprises:

receiving the subnet information from an authentication, authorization and accounting server or a dynamic host configuration protocol (DHCP) server.

* * * * *